US012659444B2

(12) United States Patent

Matsubara

(10) Patent No.: US 12,659,444 B2
(45) Date of Patent: Jun. 16, 2026

(54) IMAGE PROCESSING APPARATUS, IMAGE PROCESSING METHOD, AND STORAGE MEDIUM FOR VIRTUAL VIEWPOINT IMAGE RENDERING THROUGH MACHINE LEARNING

(71) Applicant: CANON KABUSHIKI KAISHA, Tokyo (JP)

(72) Inventor: Naoto Matsubara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 18/607,604

(22) Filed: Mar. 18, 2024

(65) Prior Publication Data

US 2024/0323331 A1     Sep. 26, 2024

(30) Foreign Application Priority Data

Mar. 22, 2023     (JP) ................................. 2023-045512

(51) Int. Cl.
*H04N 13/117*              (2018.01)
(52) U.S. Cl.
CPC .................................. *H04N 13/117* (2018.05)
(58) Field of Classification Search
CPC .............................. H04N 23/60; H04N 13/117
See application file for complete search history.

(56) References Cited

U.S. PATENT DOCUMENTS

| | | | |
|---|---|---|---|
| 2019/0221029 A1* | 7/2019 | Yoneda ...................... | G06T 7/70 |
| 2020/0053336 A1* | 2/2020 | Kawai .................. | H04N 13/111 |
| 2021/0012519 A1* | 1/2021 | Takama .................. | G06T 7/564 |
| 2022/0383589 A1* | 12/2022 | Fujita ...................... | G06T 15/20 |
| 2022/0394226 A1* | 12/2022 | Cao .......................... | G06T 9/002 |
| 2023/0370575 A1* | 11/2023 | Mizuno ..................... | G06T 7/70 |

FOREIGN PATENT DOCUMENTS

JP          2021-128592 A      9/2021

* cited by examiner

*Primary Examiner* — Terrell M Robinson
(74) *Attorney, Agent, or Firm* — Carter, DeLuca & Farrell LLP

(57)          ABSTRACT

To make it possible to obtain a highly accurate trained model with a small amount of learning time. A plurality of captured images corresponding to each of a plurality of imaging devices and virtual viewpoint information predefining a virtual viewpoint for generating a virtual viewpoint image are obtained and based on the virtual viewpoint information, an imaging device that is referred to in machine learning is selected from among the plurality of imaging devices. Then, the machine learning is performed by using learning dataset associating a captured image of a selected imaging device as reference data with a learning virtual viewpoint image generated by taking a viewpoint of the imaging device as a virtual viewpoint.

14 Claims, 9 Drawing Sheets

120

IMAGE PROCESSING APPARATUS, IMAGE PROCESSING METHOD, AND STORAGE MEDIUM FOR VIRTUAL VIEWPOINT IMAGE RENDERING THROUGH MACHINE LEARNING

BACKGROUND

Field

The present disclosure relates to an image processing apparatus performing machine learning.

Description of the Related Art

In recent years, a technique has been attracting attention, which generates 3D data of the whole space by performing synchronous image capturing for the same scene from a plurality of viewpoints with a plurality of imaging devices (cameras) and generates an image (virtual viewpoint image) representing the appearance from a free viewpoint (virtual camera) within the image capturing space based on the 3D data. However, the image quality of the virtual viewpoint image has a problem and improvement of the image quality by using machine learning has been discussed. Japanese Patent Laid-Open No. 2021-128592 has disclosed a technique to perform learning by using the virtual viewpoint image as input data and using the training data taking the captured image of the camera corresponding to the position of the virtual viewpoint as reference data (also called "correct data").

With the technique of Japanese Patent Laid-Open No. 2021-128592 described above, it is necessary to perform machine learning associating the captured image from each real camera and the virtual viewpoint image corresponding to the viewpoint of each camera with each other for all the plurality of cameras performing synchronous image capturing. Because of this, there is such a problem that much time is required for learning.

SUMMARY

The image processing apparatus according to the present disclosure is an image processing apparatus including: one or more memories storing instructions; and one or more processors executing the instructions to perform: obtaining a plurality of captured images corresponding to each of a plurality of imaging devices and virtual viewpoint information predefining a virtual viewpoint for generating a virtual viewpoint image; selecting an imaging device that is referred to in the machine learning from among the plurality of imaging devices based on the virtual viewpoint information; and the machine learning by using learning dataset associating a captured image of a selected imaging device as reference data with a learning virtual viewpoint image generated by taking a viewpoint of the imaging device as a virtual viewpoint.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
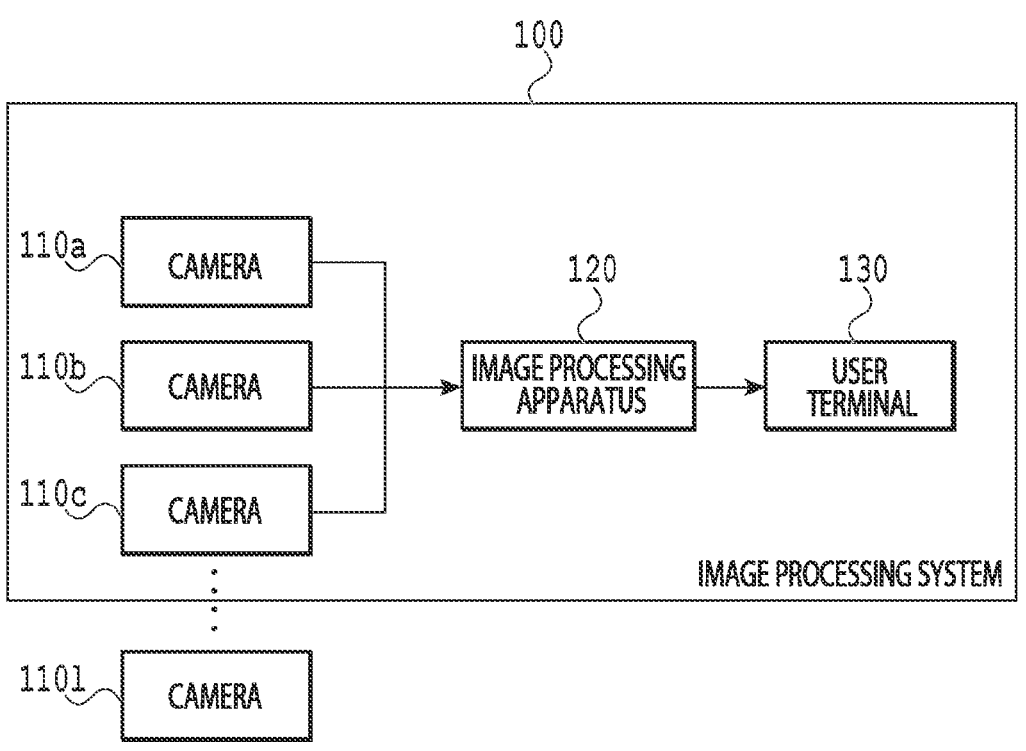
FIG. 1 is a diagram showing a configuration example of an image processing system.

FIG. 1 is a diagram showing a configuration example of an image processing system generating a virtual viewpoint image based on a plurality of captured images according to the present embodiment. An image processing system 100 has a plurality of imaging devices 110, an image processing apparatus 120, and a user terminal 130. The virtual viewpoint image in the present embodiment is also called a free viewpoint image. It is possible to regard a virtual viewpoint image as an image captured from a virtual viewpoint set within a virtual three-dimensional space (virtual space) associated with an image capturing space. Then, it is possible to represent the position and direction of view from a virtual viewpoint as the position and orientation of a virtual camera. Here, the virtual camera is a virtual camera different from a plurality of imaging devices (in the following, called "real cameras" for convenience) installed actually around the image capturing space and is a concept for conveniently explaining the virtual viewpoint relating to the generation of a virtual viewpoint image. In other words, it can be said that the virtual viewpoint image is an image representing a captured image obtained by a camera in a simulation manner in a case where it is assumed that the camera exists at the position of the virtual viewpoint set within the image capturing space. The virtual viewpoint image is not limited to the image corresponding to the virtual viewpoint (virtual camera) designated arbitrarily by a user and the image corresponding to the virtual viewpoint selected by a user from among, for example, a plurality of virtual viewpoint candidates is also included in the virtual viewpoint image in the present embodiment. Further, in the present embodiment, a case is explained mainly where the designation of a virtual viewpoint is performed by a user operation, but the designation of a virtual viewpoint may be performed automatically based on the results and the like of image analysis. Furthermore, in the present embodiment, a case is explained mainly where the virtual viewpoint image is a moving image, but the virtual viewpoint image may be a still image.

The viewpoint information used for the generation of a virtual viewpoint image is information indicating the position and orientation of the virtual camera (the position of the virtual viewpoint and direction of view from the virtual viewpoint). Specifically, the viewpoint information is a parameter set including parameters representing the three-dimensional position of the virtual viewpoint (virtual camera) and parameters representing the orientation of the virtual camera in each direction of pan, tilt, and roll. The contents of the viewpoint information are not limited to those described above. For example, in the parameter set as the viewpoint information, a parameter representing the size of the visual field (viewing angle) of the virtual viewpoint may be included. Further, the viewpoint information may have a plurality of parameter sets. For example, the viewpoint information may have a plurality of parameter sets corresponding to each of a plurality of frames configuring a virtual viewpoint image and may be information indicating the position and orientation of the virtual camera at each point in time of a plurality of continuous points in time.

Figure 2:
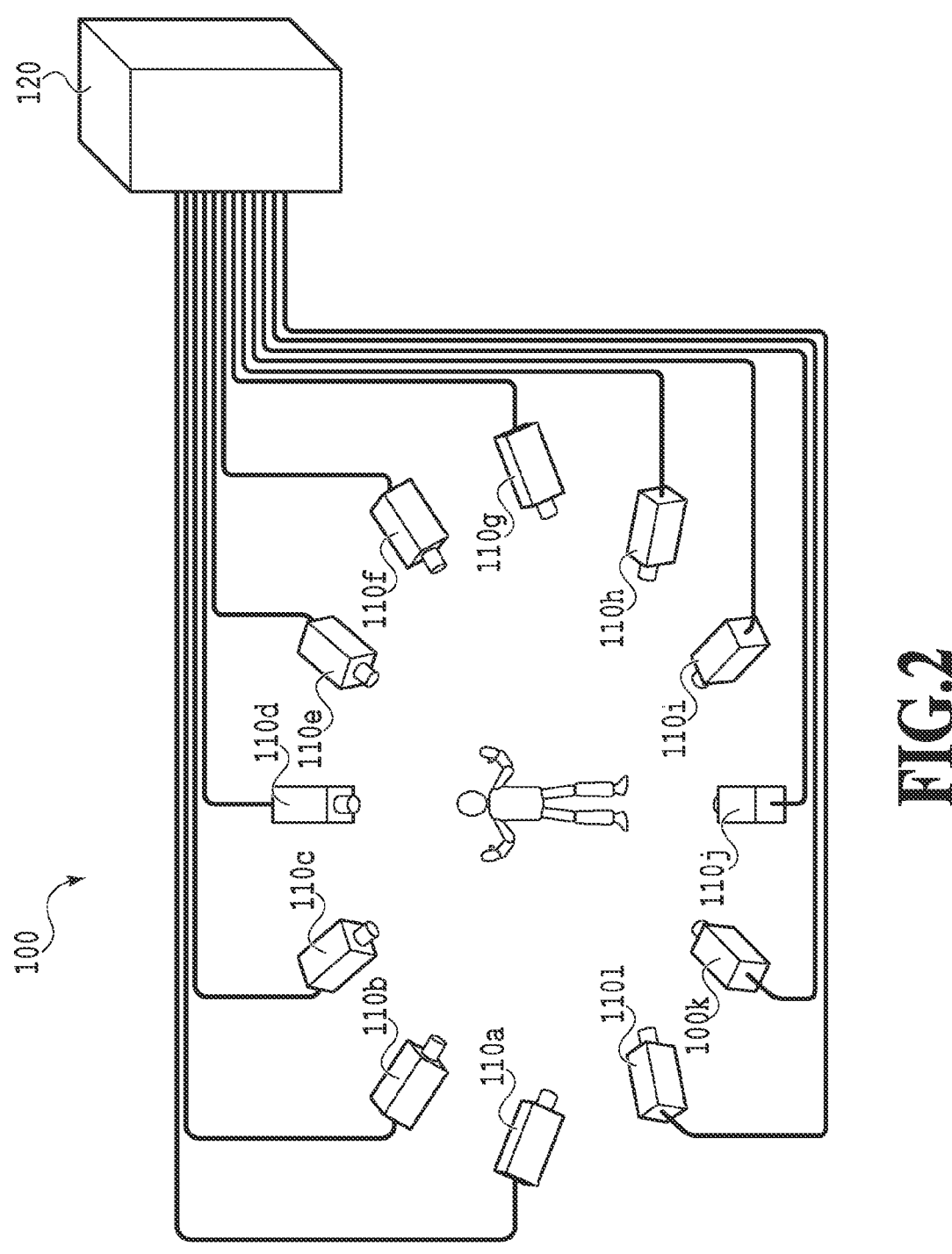
FIG. 2 is a diagram showing an installation example of real cameras.

The image processing system 100 has a plurality of the cameras 110 capturing a three-dimensional space (image capturing space) in which an object exists from a plurality of directions. The image capturing space is, for example, a competition stadium in which the game of soccer or karate is performed, a stage on which a concert is given or a performance is played, or the like. The plurality of the cameras 110 is installed at different positions so as to surround the image capturing space as shown in FIG. 2 and performs image capturing in synchronization with one another. The plurality of the cameras 110 may not be installed across the whole circumference of the image capturing space and may be installed only in the direction of part of the image capturing space due to the limitation of the installation position and the like. Further, the number of cameras 110 is determined by the dimensions of the image capturing space, the required accuracy of the virtual viewpoint image and the like. In the example in FIG. 2, 12 cameras 110a to 110l are shown, but for example, in a case where the image capturing space is very large, such as the competition stadium of soccer, the number of cameras may be about several tens to several hundreds. Further, a plurality of different types of the camera 110 may be installed, such as the telephotographic camera and the wide-angle camera.

The user terminal 130 is an information processing apparatus capable of displaying images and executing programs and that a user of a PC (Personal Computer), a tablet terminal and the like can operate.

<Hardware Configuration of Image Processing Apparatus>

Figure 3:
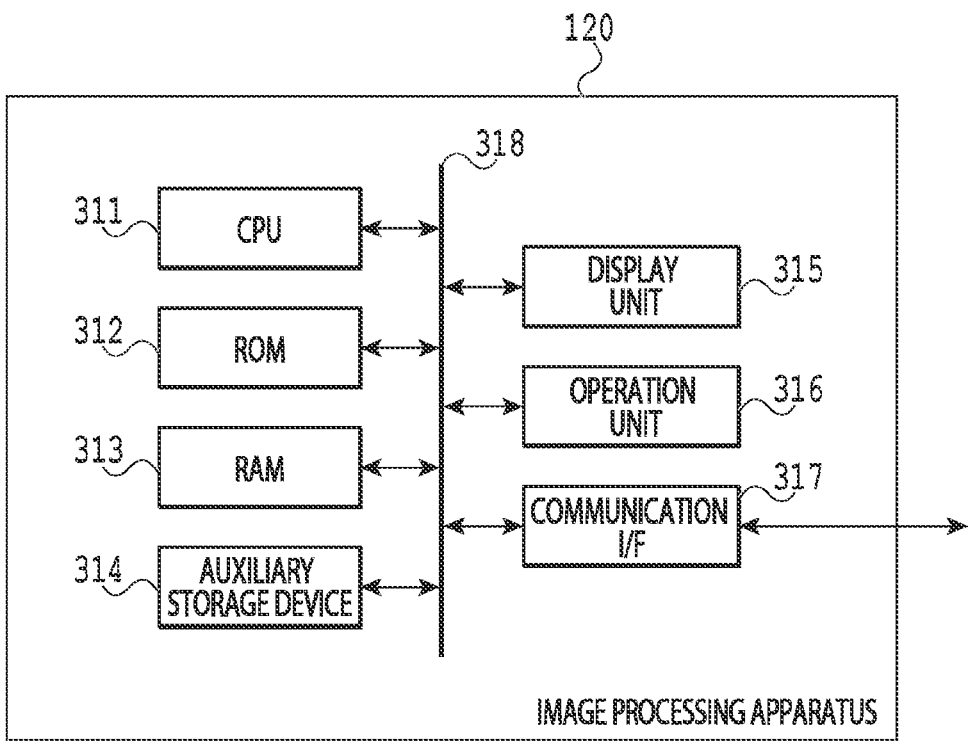
FIG. 3 is a diagram showing a hardware configuration example of an image processing apparatus.

The hardware configuration of the image processing apparatus 120 is explained by using FIG. 3. The image processing apparatus 120 has a CPU 311, a ROM 312, a RAM 313, an auxiliary storage device 314, a display unit 315, an operation unit 316, a communication I/F 317, and a bus 318.

The CPU 311 controls the whole image processing apparatus 120 by using computer programs and data stored in the ROM 312 and the RAM 313. It may also be possible for the image processing apparatus 120 to have one or a plurality of pieces of dedicated hardware different from the CPU 311 and the dedicated hardware may perform at least part of the processing to be performed by the CPU 311. As the example of the dedicated hardware, there are an ASIC (Application Specific Integrated Circuit), an FPGA (Field Programmable Gate Array), a DSP (Digital Signal Processor) and the like. The ROM 312 stores programs and the like that do not need to be changed. The RAM 313 temporarily stores programs and data supplied from the auxiliary storage device 314, data supplied from the outside via the communication I/F 317, and the like. The auxiliary storage device 314 includes, for example, a hard disk drive or the like and stores various types data, such as image data and voice data.

The display unit 315 includes, for example, a liquid crystal display, an LED, or the like and displays a GUI (Graphic User Interface) for a user to operate the image processing apparatus 120, and the like. The operation unit 316 includes, for example, a keyboard, a mouse, a joystick, a touch panel and the like and inputs various instructions upon receipt of the operation by a user. The CPU 311 operates as a display control unit configured to control the display unit 315 and an operation control unit configured to control the operation unit 316.

The communication I/F 317 is used for communication with an external device. For example, in a case where the image processing apparatus 120 is connected with an external device by a wire, a communication cable is connected to the communication I/F 317. In a case where the image processing apparatus 120 has a function to wirelessly communicate with an external device, the communication I/F 317 comprises an antenna. The bus 218 connects each of the above-described units of the image processing apparatus 120 and transmits information.

In the present embodiment, the display unit 315 and the operation unit 316 exist inside the image processing apparatus 120, but at least one of the display unit 315 and the operation unit 316 may exist as another device outside the image processing apparatus <Function Configuration of Image Processing Apparatus>

Figure 4:
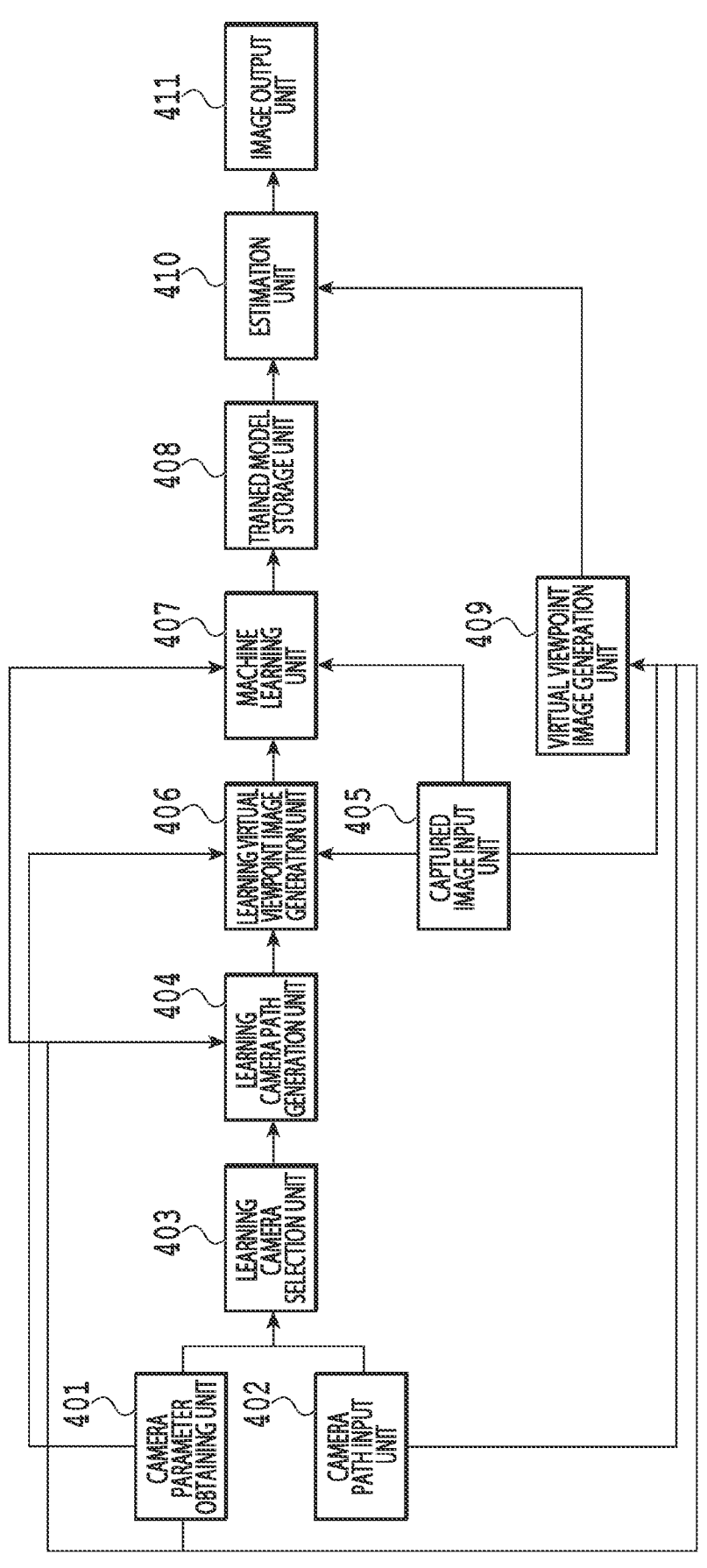
FIG. 4 is a diagram showing a function configuration of an image processing apparatus according to a first embodiment.

Next, the function of the image processing apparatus 120 is explained. FIG. 4 is a block diagram showing the function configuration of the image processing apparatus 120 according to the present embodiment.

A camera parameter obtaining unit 401 obtains and stores camera parameters of all the real cameras 110 configuring the image processing system 100. The camera parameters mean information, such as the position, orientation, focal length and the like of each of the installed real cameras 110. It is assumed that the camera parameter obtaining unit 401 stores in advance these pieces of information as camera parameters by obtaining them from a control device or the like, not shown schematically, configured to control the real camera 110. The camera parameters stored in the camera parameter obtaining unit 401 are output to a learning camera selection unit 403, a learning camera path generation unit 404, a learning virtual viewpoint image generation unit 406, and a virtual viewpoint image generation unit 409 and used for processing in each function unit.

A camera path input unit 402 inputs a camera path as virtual viewpoint information necessary for generating a virtual viewpoint image requested by a user, which is sent from, for example, the user terminal 130. Here, the camera path is information indicating the locus of movement in a time series of the virtual camera (virtual viewpoint) and includes camera parameters in a plurality of frames identified by a time code respectively. The camera path input unit 402 outputs the input camera path to the learning camera selection unit 403 and the virtual viewpoint image generation unit 409.

The learning camera selection unit 403 identifies a real camera whose value of orientation is close to that of a virtual camera for each time code and selects it as the real camera of a captured image used for machine learning by using the input camera parameters of a plurality of the real cameras

110 and the input camera path. The reason attention is focused on the value of orientation is that even in a case of a camera whose position is quite different (the distance to the object is quite different), on a condition that the orientation (line-of-sight direction) of the camera is the same, the appearance of an object captured in the captured image is similar, and therefore, the camera can be utilized for learning. The "value of orientation" used here refers to the distance in each of a plurality of parameters (pan, tilt, roll) identifying the orientation of a camera. The learning camera selection unit 403 performs processing to select a real camera capturing a captured image of each frame, whose appearance is close to that of the image (virtual viewpoint image) of each frame generated by the input camera path based on the orientation thereof. In this case, the number of real cameras 110 selected because whose "value of orientation" is close is not limited to one and may be a plurality of the real cameras 110. The "value of orientation" may be any value capable of evaluating the similarity of orientation between the virtual camera and the real camera and for example, it may also be possible to perform a comparison by using the total of the values of pan, tilt, and roll respectively, or perform a comparison by using only the difference value of a specific parameter. Information on the real camera selected for each time code (that is, information on the real camera corresponding to the captured image used in machine learning) is output to the learning camera path generation unit 404 as learning camera information.

The learning camera path generation unit 404 generates a learning camera path for generating a virtual viewpoint image used for machine learning based on the "real camera whose value of orientation is close to that of the virtual camera" selected for each frame indicated by the learning camera information and the camera parameters of each real camera. The learning camera path generated here is what is obtained by describing the camera parameters of the real camera whose "value of orientation" is determined to be close to that of the virtual camera for each time code. Then, in a case where a plurality of real cameras is selected by the learning camera selection unit 403, for the virtual camera in all time codes of the input camera path, the number of learning camera paths corresponding to the number of selected real cameras is generated. The generated learning camera path is output to the learning virtual viewpoint image generation unit 406.

A captured image input unit 405 inputs all the captured images used for generating a virtual viewpoint image, which are sent from a plurality of the real cameras 110. The input captured images of the plurality of the real cameras 110 are output to the learning virtual viewpoint image generation unit 406, a machine learning unit 407, and the virtual viewpoint image generation unit 409.

The learning virtual viewpoint image generation unit 406 generates a learning virtual viewpoint image for the use in machine learning based on the camera parameters of each of the plurality of the real cameras 110, the plurality of captured images obtained by the plurality of the real cameras 110, and the learning camera path. The learning virtual viewpoint image is a virtual viewpoint image generated by taking the viewpoint of the real camera selected because its value of orientation is close to that of the virtual camera as a virtual viewpoint, and the generation method thereof is the same as that of the virtual viewpoint image generation unit 409, to be described later. That is, the learning virtual viewpoint image generation unit 406 differs from the virtual viewpoint image generation unit 409, to be described later, only in the role and the contents of the processing performed by both are the same. The learning virtual viewpoint images are generated in number corresponding to the number of input learning camera paths. The generated learning virtual viewpoint image is output to the machine learning unit 407.

The machine learning unit 407 generates a trained model for improving image quality by, for example, such as jelly noise removal and blur removal, by performing machine learning based on the input learning virtual viewpoint image and the input plurality of captured images by the plurality of the real cameras 110. In a case where machine learning is performed, learning dataset in which the learning virtual viewpoint image and the captured image of the real camera as reference data thereof are associated with each other is created. At this time, in a case where the estimation-target virtual viewpoint image is a moving image including a plurality of fames, learning datasets corresponding to the time codes thereof are created. Specifically, the time codes of the input learning camera path are referred to in order from the top and the frame of the captured image of the selected real camera corresponding to a time code of interest and the frame of the learning virtual viewpoint image corresponding to the time code of interest are associated with each other. At this time, in a case where a plurality of real cameras is selected for one time code, each captured image of the plurality of real cameras and each learning virtual viewpoint image corresponding to each of the plurality of the real cameras are associated with each other in a one-to-one manner.

In a case where, for example, a neural network referring to previous and subsequent frames is used as the method of machine learning, learning dataset is created so that a group of images of successive frames is obtained by integrating a plurality of time codes into one time code. Specifically, first, learning dataset is created by associating the frame in the captured image of the real camera corresponding to the time code of interest as reference data with the frame in the learning virtual viewpoint image corresponding to the time code of interest. Next, by referring to the time codes before and after the time code of interest, whether the same real camera is associated with the time codes before and after the time code of interest is checked. In a case where the association is established, the frame in the captured image of the real camera associated with the previous and subsequent time codes is taken as reference data and associated with the frame in the learning virtual viewpoint image corresponding to the previous and subsequent time codes and added to the learning dataset. The processing such as this is performed repeatedly until the continuity of the time codes arranged in a time series is interrupted. Then, the group of successive frames in the captured image of the same real camera and the group of successive frames in the learning virtual viewpoint image generated with the same time codes are associated with each other as "successive image group" respectively within the learning dataset obtained by the above-described processing. Machine learning is performed the number of times corresponding to the number of learning datasets thus obtained and the same number of trained neural networks as trained models as the same number of times machine learning is performed and frame information corresponding to each trained neural network are generated. The generated trained models and the frame information thereon are output to a trained model storage unit 408.

The trained model storage unit 408 stores the frame information and the trained model for each section, which are input from the machine learning unit 407, and outputs them to an estimation unit 410.

The virtual viewpoint image generation unit 409 generates a virtual viewpoint image in accordance with the camera path designated by a user, which is input from the camera path input unit 402, based on a plurality of captured images by a plurality of the real cameras 110, which is input from the captured image input unit 405. Specifically, a virtual viewpoint image is generated by performing processing, such as foreground/background separation, generation of three-dimensional shape data of the foreground, and coloring of the three-dimensional shape data of the foreground, for each frame of the plurality of captured images. Details of each piece of processing are not the point of the present invention, and therefore, explanation is omitted. The generated virtual viewpoint image is output to the estimation unit 410.

The estimation unit 410 performs estimation for the virtual viewpoint image input from the virtual viewpoint image generation unit 409 by using the trained model received from the trained model storage unit 408 and the frame information corresponding to each trained model. This estimation is performed by inputting the frame of the time code of interest in the virtual viewpoint image to the trained model corresponding to the time code of interest. Each frame obtained by the estimation is arranged again in order of the time code and output to an image output unit 411 as the estimated virtual viewpoint image.

The image output unit 411 converts the estimated virtual viewpoint image input from the estimation unit 410 into a transmission signal that can be transmitted and output the transmission signal to the user terminal 130.

<Processing Flow in Image Processing Apparatus>

Figure 5:
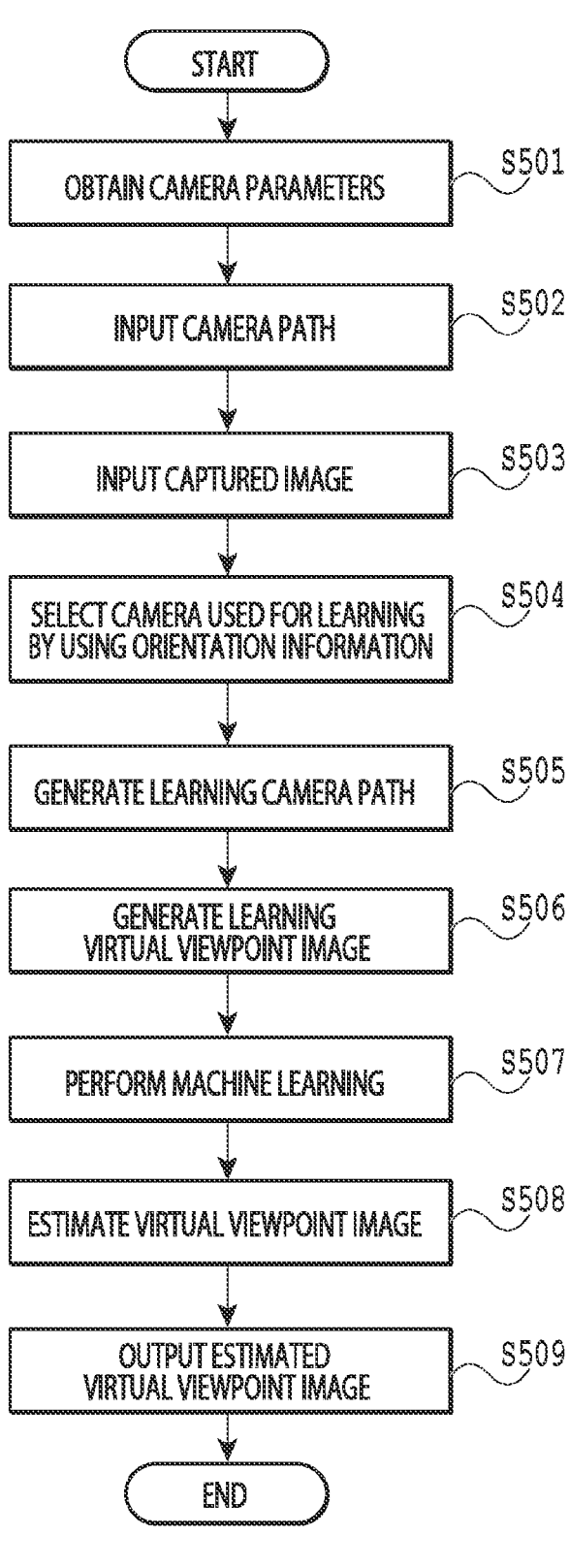
FIG. 5 is a diagram showing an operation flow of the image processing apparatus according to the first embodiment.

Next, the flow of each piece of processing in the image processing apparatus 120 according to the present embodiment is explained with reference to the flowchart in FIG. 5. In the flowchart in FIG. 5, explanation of the generation processing of a virtual viewpoint image in the virtual viewpoint image generation unit 409 is omitted, but the generation processing is performed separately in parallel to each piece of processing at S504 to S507. In the following explanation, a symbol "S" means a step.

At S501, the camera parameter obtaining unit 401 obtains camera parameters of each of all the real cameras 110. The obtained camera parameters are output to the learning camera selection unit 403, the learning camera path generation unit 404, the learning virtual viewpoint image generation unit 406, and the virtual viewpoint image generation unit 409.

At S502, the camera path input unit 402 inputs the camera path for generating a virtual viewpoint image desired by a user from a virtual viewpoint controller or the like, not shown schematically. The input camera path designated by a user is output to the learning camera selection unit 403 and the virtual viewpoint image generation unit 409.

At S503, the captured image input unit 405 receives the input of a plurality of captured images by a plurality of the real cameras 110. The input plurality of captured images is output to the learning virtual viewpoint image generation unit 406, the machine learning unit 407, and the virtual viewpoint image generation unit 409.

Figure 6A:
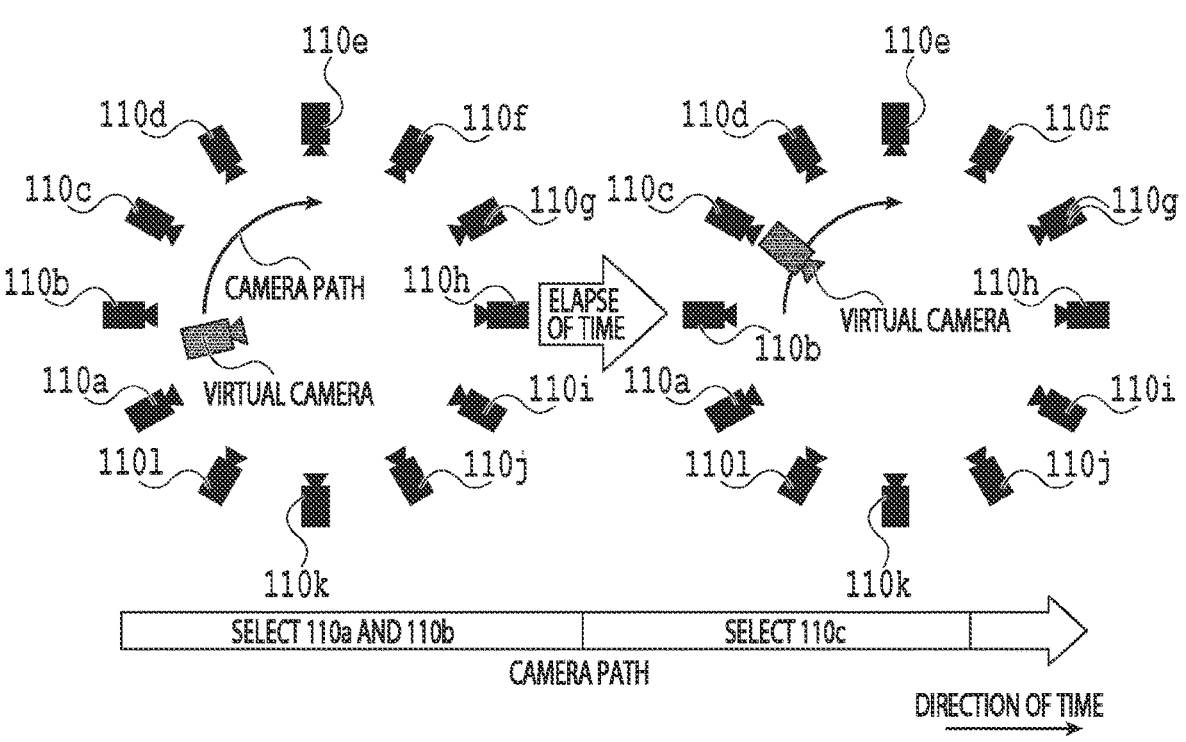
FIG. 6A and FIG. 6B are diagrams explaining the way a real camera is selected in accordance with each time code.

At S504, the learning camera selection unit 403 selects the real camera corresponding to the captured image used in machine learning by using orientation information based on the camera parameters of all the real cameras 110 and the camera path designated by a user. FIG. 6A is a diagram explaining the way the real camera is selected in accordance with the orientation of the virtual camera for each time code in the camera path. It is indicated that in the camera path shown in FIG. 6A, while the virtual camera is in the vicinity of the start position, the real cameras 110a and 110b are selected and as the virtual camera moves from the start position, the real camera that is selected changes to the real camera 110c. Information on the real camera selected using the orientation information in this manner is output to the learning camera path generation unit 404 as learning camera information.

At S505, the learning camera path generation unit 404 generates a learning camera path for generating a learning virtual viewpoint image based on the learning camera information input from the learning camera selection unit 403 and the camera parameters of all the real cameras 110. The generated learning camera path is output to the learning virtual viewpoint image generation unit 406.

At S506, the learning virtual viewpoint image generation unit 406 generates a learning virtual viewpoint image based on the camera path input from the learning camera path generation unit 404, the camera parameters of all the real cameras 110, and the plurality of captured images input from the captured image input unit 405. The generated learning virtual viewpoint image is output to the machine learning unit 407.

At S507, the machine learning unit 407 performs machine learning by using the learning virtual viewpoint image input from the learning virtual viewpoint image generation unit 406 and the plurality of captured images input form the captured image input unit 405. The trained model obtained by machine learning is output to the trained model storage unit 408 along with the time code information corresponding to the trained model.

At S508, the estimation unit 410 performs estimation processing for the virtual viewpoint image input from the virtual viewpoint image generation unit 409 by using the trained model input from the trained model storage unit 408. At this time, estimation is performed by using the trained model in accordance with the time code of interest. The new virtual viewpoint image obtained by estimation is output to the image output unit 411.

At S509, the image output unit 411 outputs the estimated virtual viewpoint image input from the estimation unit 410 to the user terminal 130.

The above is the flow of the processing in the image processing apparatus 120 according to the present embodiment. Each piece of processing to be performed by the image processing apparatus 120 explained in the present embodiment may be performed by a plurality of image processing apparatuses in a sharing manner. For example, the generation processing of a virtual viewpoint image performed by the learning virtual viewpoint image generation unit 406 and the virtual viewpoint image generation unit 409 may be performed by another image processing apparatus. Alternatively, it may also be possible to divide the processing into a learning phase and an estimation phase and perform each phase by different image processing apparatuses.

Modification Example

In the embodiment described above, the orientation information on the virtual camera and each real camera is used in a case where a learning camera is selected, but it may also be possible to further use position information and focal length information.

Figure 6B:
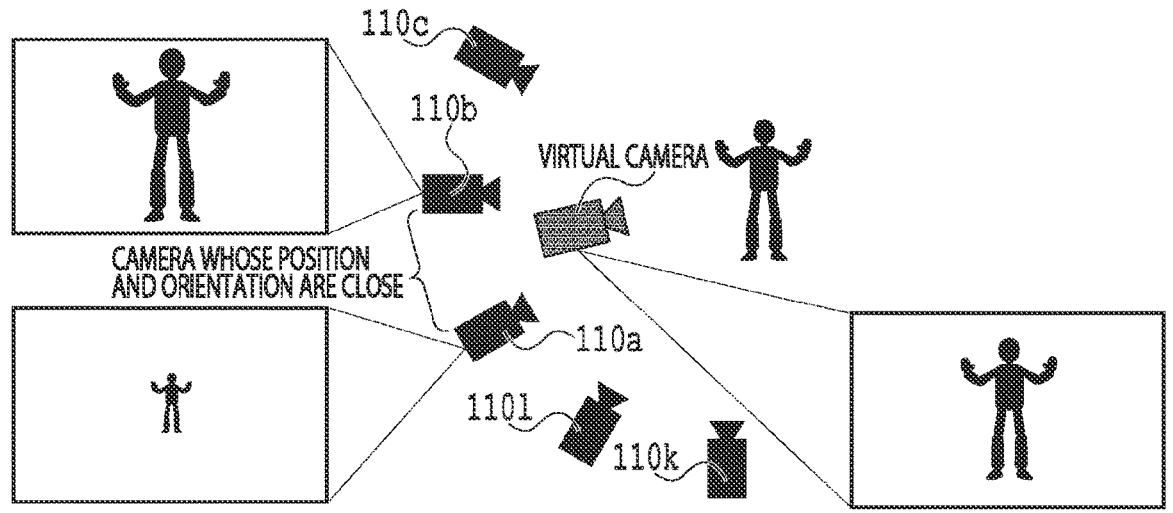

In a case of the present modification example, the learning camera selection unit 403 selects a real camera used for leaning by identifying a real camera whose both values of position and orientation are each closer than a certain predetermined value by taking the position and orientation of the virtual camera as a reference for each time code with reference to the camera path. Here, as the value of position, it may be possible to use three-dimensional coordinate values predefining the image capturing space by three axes of XYZ, which are included in the camera parameters. The value of orientation is as described above. Further, the determination method of a value may be an automatic calculation method by a program and the like, in addition to a user designation method. Then, as a result of the above-described processing, in a case where it is determined that the values of the position and orientation of a plurality of real cameras are close to those of the virtual camera for the time code of interest, a real camera whose value of the focal length is the closest to that of the virtual camera is further selected as a real camera corresponding to the time code of interest. At this time, in a case where a plurality of real cameras whose focal length is the same exists, the plurality of real cameras is selected. FIG. 6B is a diagram explaining the way a real camera whose focal length is closer is selected from among the real cameras selected by using the position and orientation as a reference. In the example in FIG. 6B, from the two real cameras 110a and 110b whose position and orientation are determined to be close to those of the virtual camera, the real camera 110b whose focal length (viewing angle) is close to that of the virtual camera is selected. Based on the learning camera information including information on the real camera thus selected, the learning camera path generation unit 404 generates a learning cameral path.

As above, according to the present modification example, by using information on the position and focal length, in addition to orientation information, it is possible to select a real camera performing image capturing with an appearance close to that of the virtual camera. Due to this, it is possible to further suppress the number of real cameras that are taken as a target of machine learning.

According to the present embodiment, the parameter values representing the position, orientation, and focal length of the virtual camera in the designated camera path and the parameter values of each real camera are compared and a learning camera is selected in accordance with elapsed time. By limiting the number of learning cameras in this manner, it is made possible to reduce the time required for machine learning while maintaining the quality of estimation.

Second Embodiment

Following the above, an aspect is explained as a second embodiment, in which the target frame (time code) in a case where a learning camera is selected is limited with reference to the amount of movement between frames of a virtual camera in the camera path designated by a user. Explanation of the contents common to those of the first embodiment, such as the system configuration, is omitted and in the following, different points are explained mainly.
<Function Configuration of Image Processing Apparatus>

Figure 7:
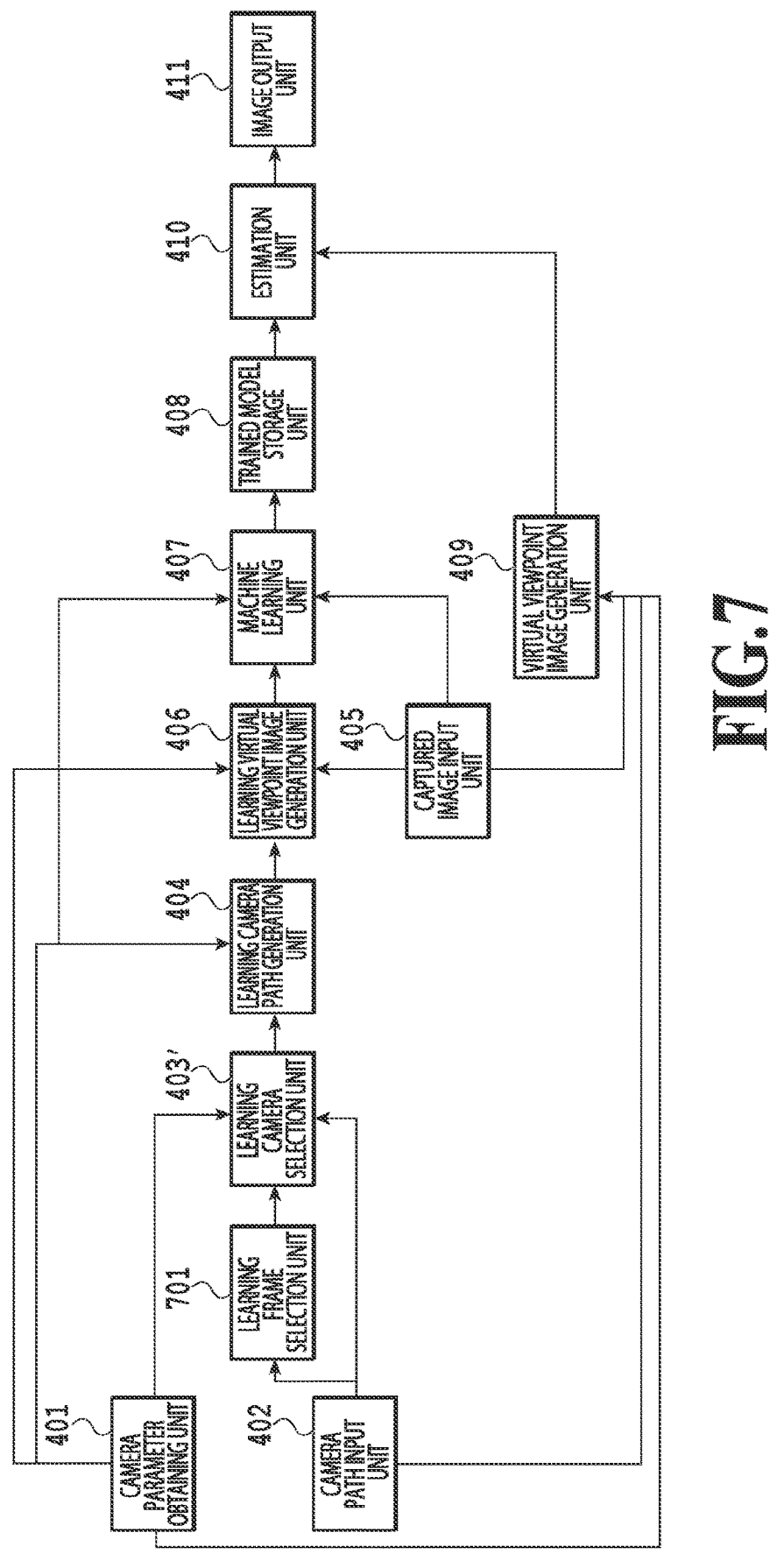
FIG. 7 is a diagram showing a function configuration of an image processing apparatus according to a second embodiment.

FIG. 7 is a block diagram showing the function configuration of the image processing apparatus 120 according to the present embodiment. In FIG. 7, to the block performing the same function as that of the first embodiment, the same number is attached and explanation is omitted.

Figure 9:
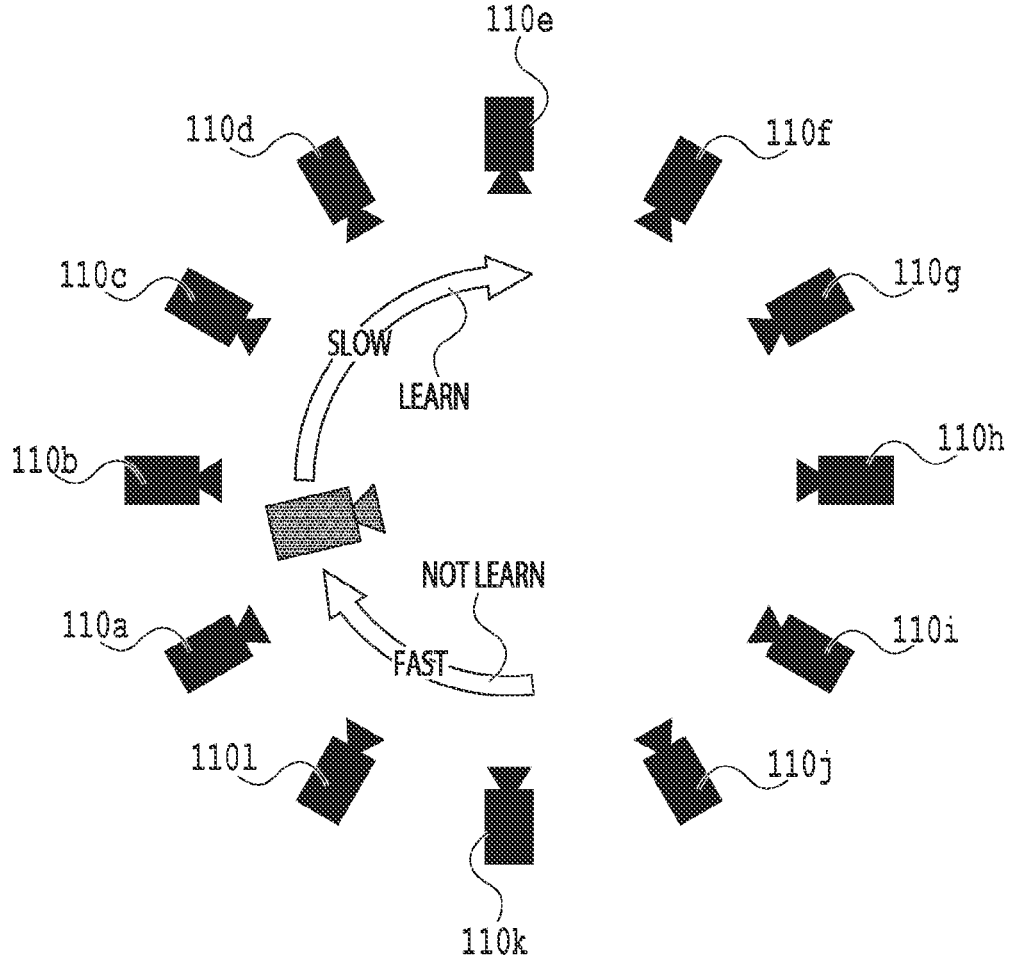
FIG. 9 is a diagram explaining the way selection of a processing-target frame is performed by paying attention on an amount of movement of a virtual camera between frames.

A learning frame selection unit 701 refers to the camera path input from the camera path input unit 402 and selects a frame belonging to the section in which the amount of movement of the virtual camera between frames is less than a predetermined amount. That is, control is performed so that the selection of a learning camera is not performed for the frame section in which the amount of change in the position of the virtual camera between frames is larger than or equal to a predetermined amount. The reason is that for the scene in which the change in the amount of viewpoint movement and in the amount of orientation movement of the virtual camera is large, the coarseness of an image is not conspicuous, and therefore, the low necessity for learning is taken into consideration. FIG. 9 is a diagram explaining the way the selection of a processing-target frame is performed by paying attention on the amount of movement of the virtual camera between frames. FIG. 9 shows the way the selection is performed so that the frame section in which the amount of movement is large between frames (the moving speed of the virtual camera is high) is excluded from the target of learning and the frame section in which the amount of movement is small (the moving speed of the virtual camera is low) is taken as the target of learning. In the example in FIG. 9, for the first half frame section of the camera path, in which the moving speed of the virtual camera is high, the selection of a real camera is not performed and in the second half frame section in which the moving speed is low, the selection of a real camera is performed. It may also be possible to perform the selection of a processing-target frame so that the frame section in which the amount of change in the orientation is small is the target of learning by excluding the section in which the amount of change in the orientation is large between frames based the same way of thinking. The learning frame selectin unit 701 generates frame information in which the selected frame is taken as the selection target of a learning camera and outputs the frame information to the learning camera selection unit 403.

A learning camera selection unit 403' identifies a real camera whose value of orientation is close to that of the virtual camera for each time code attached to the frame indicated by the frame information and selects the real camera as one whose captured image is used for machine learning. Alternatively, as in the case of the modification example described previously, it may also be possible to select a real camera by using further the position and the value of the focal length as well.
<Processing Flow in Image Processing Apparatus>

Figure 8:
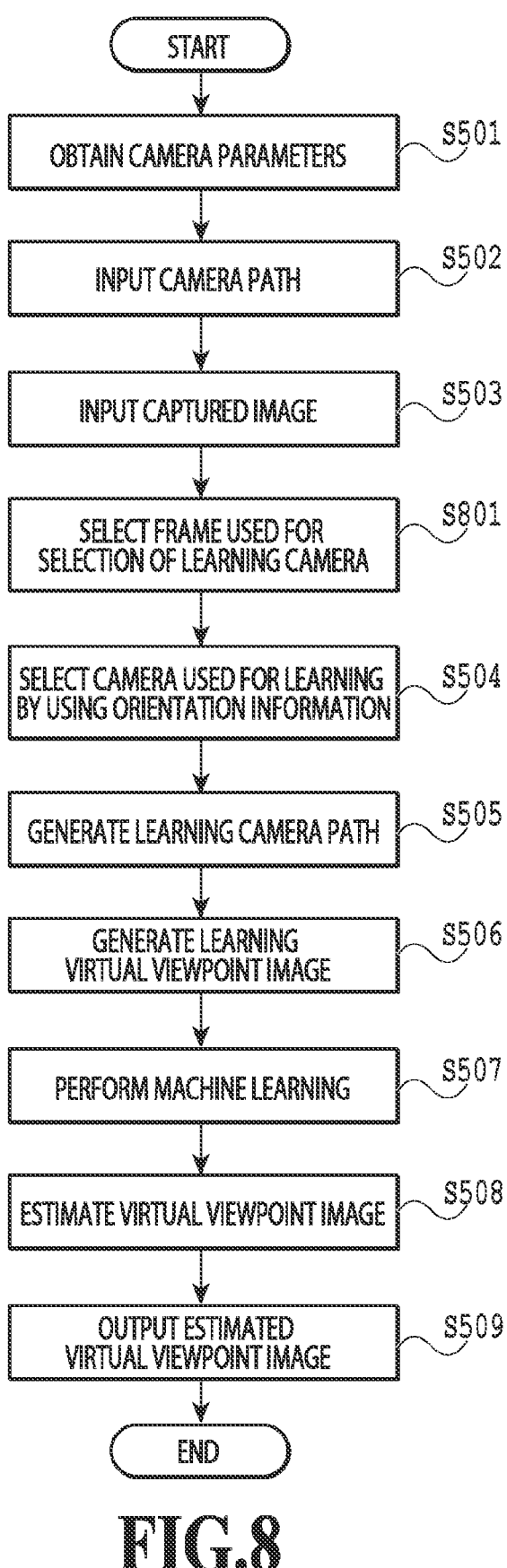
FIG. 8 is a diagram showing an operation flow of the image processing apparatus according to the second embodiment.

Next, the flow of each piece of processing in the image processing apparatus 120 according to the present embodiment is explained with reference to the flowchart in FIG. 8. In the following explanation, a symbol "S" means a step. In the flowchart in FIGS. 8, S501 to S503 and S504 to S509 are the same as those in the first embodiment, and therefore, explanation is omitted.

At S801, the learning frame selection unit 701 first refers to the camera path designated by a user, which is input at S502, and identifies a frame section in which the difference in the position and/or the value of orientation is larger than or equal to a predetermined amount between adjacent frames. Then, the learning frame selection unit 701 generates frame information by performing selection so that the frame in a frame section other than the identified frame section is the target frame for which the selection of a learning camera is performed and outputs the frame information to the learning camera selection unit 403. Then, at S504 that follows, the learning camera selection unit 403 selects a learning camera based on the camera parameters of each real camera 110 and the camera path designated by a user by taking only the time code of the frame indicated by the frame information as a target.

The above is the flow of the processing in the image processing apparatus 120 according to the present embodiment. At S504 of the present embodiment, it may also be possible to perform the processing explained in the modification example of the first embodiment, that is, perform the selection of a learning camera using positional information and focal length information, in addition to the orientation information.

As above, according to the present embodiment, only the frame section in which the amount of change in the position and/or the orientation of the virtual camera is small in the designated camera path is selected as the frame for which the selection of a learning camera is performed. Due to this, in addition to the effects of the first embodiment, it is made possible to efficiently learn the portion in which the coarseness may be conspicuous in the completed virtual viewpoint image by giving importance thereto.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to obtain a highly accurate trained model with a small amount of learning time.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-045512, filed Mar. 22, 2023, which is hereby incorporated by reference wherein in its entirety.

What is claimed is:
1. An image processing apparatus comprising:
one or more memories storing instructions; and
one or more processors executing the instructions to perform:

12 obtaining a plurality of captured images corresponding to each of a plurality of imaging devices and virtual viewpoint information predefining a virtual viewpoint for generating a virtual viewpoint image;

selecting an imaging device that is referred to in a machine learning from among the plurality of imaging devices based on the virtual viewpoint information;

the machine learning by using learning dataset associating a captured image of a selected imaging device as reference data with a learning virtual viewpoint image generated by taking a viewpoint of the imaging device as a virtual viewpoint; and in a case where the plurality of captured images and the virtual viewpoint image are moving images including a plurality of frames identified by a time code and the virtual viewpoint information is a camera path indicating a locus of movement in a time series of a virtual viewpoint:

the selection is performed for each time code; and the machine learning is performed by using the learning dataset corresponding to each time code.

2. The image processing apparatus according to claim 1, wherein
an imaging device performing image capturing from a viewpoint similar to a virtual viewpoint indicated by the virtual viewpoint information is selected from among the plurality of imaging devices.

3. The image processing apparatus according to claim 1, wherein
in the selecting, whether or not the viewpoint of each of the plurality of imaging devices and the virtual viewpoint indicated by the virtual viewpoint information are similar is determined based on a value of direction of view thereof.

4. The image processing apparatus according to claim 3, wherein
the value of the direction of view is a value predefined by pan, tilt, and roll.

5. The image processing apparatus according to claim 3, wherein
in the selecting, whether or not the viewpoint of each of the plurality of imaging devices and the virtual viewpoint indicated by the virtual viewpoint information are similar to each other is determined further based on a position thereof and a value of a focal length.

6. The image processing apparatus according to claim 1, wherein
in a case where a plurality of imaging devices is selected, the machine learning is performed by using learning dataset associating each captured image by the plurality of imaging devices as reference data with each learning virtual viewpoint image generated by taking the viewpoint of each of the plurality of imaging devices as a virtual viewpoint in a one-to-one manner.

7. The image processing apparatus according to claim 1, wherein
in the learning dataset corresponding to each time code, a frame in a captured image of a selected imaging device, which corresponds to a time code of interest, as reference data is associated with a frame in the learning virtual viewpoint image, which corresponds to the time code of interest.

8. The image processing apparatus according to claim 7, wherein
the selection is performed by taking a frame whose amount of change in the virtual viewpoint between frames in the camera path is less than a predetermined amount as a target among the plurality of imaging devices.

9. The image processing apparatus according to claim 8, wherein the amount of change in the virtual viewpoint between the frames is an amount of change in position of the virtual viewpoint between the frames.

10. The image processing apparatus according to claim 8, wherein the amount of change in the virtual viewpoint between the frames is an amount of change in direction of view from the virtual viewpoint between the frames.

11. The image processing apparatus according to claim 1, wherein the one or more processors further execute the instructions to perform:

estimation for a virtual viewpoint image generated based on the plurality of captured images and the virtual viewpoint information by using a trained model obtained by the machine learning.

12. The image processing apparatus according to claim 1, wherein the one or more processors further execute the instructions to perform:

estimation for a virtual viewpoint image generated based on the plurality of captured images and the virtual viewpoint information by using a trained model obtained by the machine learning and in a case where a trained model different for each time code exists, the estimation is performed by using a trained model in accordance with a time code of interest.

13. An image processing method comprising:

obtaining the plurality of captured images corresponding to each of a plurality of imaging devices and virtual viewpoint information predefining a virtual viewpoint for generating a virtual viewpoint image;

selecting an imaging device that is referred to in a machine learning from among the plurality of imaging devices based on the virtual viewpoint information;

performing the machine learning by using learning dataset associating a captured image of a selected imaging device as reference data with a learning virtual viewpoint image generated by taking a viewpoint of the imaging device as a virtual viewpoint; and in a case where the plurality of captured images and the virtual viewpoint image are moving images including a plurality of frames identified by a time code and the virtual viewpoint information is a camera path indicating a locus of movement in a time series of a virtual viewpoint:

the selection is performed for each time code; and the machine learning is performed by using the learning dataset corresponding to each time code.

14. A non-transitory computer readable storage medium storing a program for causing a computer to perform an image processing method comprising:

obtaining the plurality of captured images corresponding to each of a plurality of imaging devices and virtual viewpoint information predefining a virtual viewpoint for generating a virtual viewpoint image;

selecting an imaging device that is referred to in a machine learning from among the plurality of imaging devices based on the virtual viewpoint information;

performing the machine learning by using learning dataset associating a captured image of a selected imaging device as reference data with a learning virtual viewpoint image generated by taking a viewpoint of the imaging device as a virtual viewpoint; and in a case where the plurality of captured images and the virtual viewpoint image are moving images including a plurality of frames identified by a time code and the virtual viewpoint information is a camera path indicating a locus of movement in a time series of a virtual viewpoint:

the selection is performed for each time code; and the machine learning is performed by using the learning dataset corresponding to each time code.

* * * * *